US006999200B2

(12) United States Patent
Shiraishi

(10) Patent No.: US 6,999,200 B2
(45) Date of Patent: Feb. 14, 2006

(54) METHOD OF AND DEVICE FOR MANAGING PRINT COLORS, AND IMAGE DATA PROCESSING DEVICE

(75) Inventor: Yasuhito Shiraishi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 950 days.

(21) Appl. No.: 09/828,984

(22) Filed: Apr. 10, 2001

(65) Prior Publication Data

US 2001/0038388 A1 Nov. 8, 2001

(51) Int. Cl.
*H04N 1/50* (2006.01)
*H04N 1/60* (2006.01)
*B41C 1/00* (2006.01)
*B41M 1/14* (2006.01)
*B41F 33/10* (2006.01)

(52) U.S. Cl. ....................... 358/1.9; 358/504; 358/518; 358/501; 101/484; 101/147; 101/211

(58) Field of Classification Search ................ 358/504, 358/505, 518, 1.9, 1.6, 501; 382/162, 167; 347/6, 70, 71, 220; 101/395, 453, 211, 171, 101/484, 147; 346/107.1
See application file for complete search history.

(56) References Cited

U.S. PATENT DOCUMENTS 4,854,232 A * 8/1989 Oda ........................... 101/211
5,182,721 A 1/1993 Kipphan et al. ............ 364/526

(Continued)

FOREIGN PATENT DOCUMENTS

DE 19533811 A 3/1997

(Continued)

OTHER PUBLICATIONS

*Text and Graphics Society Bulletin*, vol. 5, No. 21 (Whole No. 117), Japan Association of Graphics Arts and Technology, Aug. 13, 1999, pp. 1-3. (w/partial English translation).

(Continued)

*Primary Examiner*—Scott Rogers
*Assistant Examiner*—Beniyam Menberu
(74) *Attorney, Agent, or Firm*—McDermott Will & Emery LLP

(57) ABSTRACT

A plate-recording and printing system is provided with a printing plate recording device for recording an image on a printing plate based upon binary image data formed in an image data processing device, a printing press for carrying out a printing operation by using the printing plate, an image pickup device for picking up an image of a printed object and a profile forming device for forming profile data of the printing press from picked up image data. A printing operation is carried out under reference conditions by using predetermined ink and sheet of printing paper. An image of a color chart on the printed object is picked up by the image pickup. Print color of the color chart is determined in the Lab color system based upon image data. Printing press profile data is generated as a function of print color and predetermined reference color of the color chart. This profile data is stored in association with kinds of ink and sheets of printing paper used in the printing press. Prior to forming binary image data used in the printing plate recording device, the image data processing device specifies printing conditions of the ink and sheets of printing paper used in the printing press placed on the following stage, and reads profile data related to these printing conditions. Then, it carries out a color conversion on the image data by using the profile.

4 Claims, 8 Drawing Sheets

U.S. PATENT DOCUMENTS

| | | | | |
|---|---|---|---|---|
| 5,502,580 | A * | 3/1996 | Yoda et al. | 358/518 |
| 5,508,826 | A * | 4/1996 | Lloyd et al. | 358/501 |
| RE35,495 | E | 4/1997 | Bolza-Schuenemann et al. | 101/232 |
| 5,662,044 | A | 9/1997 | Löffler et al. | |
| 5,699,491 | A * | 12/1997 | Barzel | 358/1.9 |
| 6,009,807 | A | 1/2000 | Yoshida et al. | 101/177 |
| 6,041,708 | A | 3/2000 | Kipphan et al. | 101/365 |
| 6,069,707 | A * | 5/2000 | Pekelman | 358/1.6 |
| 6,075,885 | A | 6/2000 | Taniguchi et al. | 382/162 |
| 6,230,622 | B1 * | 5/2001 | Dilling | 101/484 |
| 6,324,975 | B1 * | 12/2001 | Kondo | 101/171 |
| 6,580,524 | B1 * | 6/2003 | Weichmann et al. | 358/1.9 |

FOREIGN PATENT DOCUMENTS

| | | | |
|---|---|---|---|
| DE | 19844495 | A | 4/2000 |
| EP | 0518559 | A | 12/1992 |
| EP | 0867279 | A | 9/1998 |
| JP | 62-150252 | | 7/1987 |
| JP | 1-306246 | | 12/1989 |
| JP | 3-264359 | | 11/1991 |
| JP | 8-207256 | | 8/1996 |
| JP | 9-29945 | | 2/1997 |
| JP | 2824334 | | 9/1998 |
| JP | 10-272756 | | 10/1998 |
| JP | 2000-103028 | | 4/2000 |

OTHER PUBLICATIONS

"Cooperation for Integration of Prepress, Press, and Postpress," *Catalogue of Dainippon Screen Mfg. Co., Ltd.*, Jul. 1999, pp. 1-4.

"ICC Profile Format Specification", International color Consortium, Version 3.2, Nov. 20, 1995, pp. *i*-113.

* cited by examiner

FIG. 7

| INK | SHEET OF PRINTING PAPER | PROFILE |
|---|---|---|
| A COMPANY 1 | X COMPANY 1 | pf1 |
| A COMPANY 2 | X COMPANY 1 | pf2 |
| B COMPANY 1 | X COMPANY 1 | pf3 |
| B COMPANY 2 | X COMPANY 2 | pf4 |
| B COMPANY 3 | X COMPANY 3 | pf5 |
| C | X COMPANY 1 | pf6 |

⋮

METHOD OF AND DEVICE FOR MANAGING PRINT COLORS, AND IMAGE DATA PROCESSING DEVICE

BACKGROUND OF THE INVENTION

1. Field of the Invention

The present invention relates to a color management technique used in a process in which printing plates are formed on the basis of binary image data obtained by subjecting multi-value image data to RIP (Raster-Image-Processing) and ink is applied to the printing plates to print an image on a sheet of printing paper.

2. Description of the Background Art

Conventionally, in a color monitor of a computer for displaying image and a color printer or the like for providing a color output by using the image data, there has been a problem in which even when the same image data is used, reproduced colors are not made coincident with each other. In recent year, a color management is carried out so as to solve this problem.

The color management is a technique in which a device profile representing color-reproduction characters (hereinafter, referred to simply as "profile") is prepared for each of digital input devices and digital output devices, and based upon this profile, image data is color-converted through device-independent colors that are independent of the devices. With respect to such profiles, the ICC profile is standardized by the ICC, which is the international standardization organization.

In contrast to digital devices such as the above-mentioned color monitors and color printers, the color management using profiles has not been applied to general printing presses such as planographic offset printing presses. One of the reasons for this is that the printing plate making routine (or prepress routine) is carried out independently from the printing routine and, in most cases, the printing plates are still formed through an analog exposing process. Moreover, another problem is that, in general printing presses, there is a great difference in color reproducing characteristics depending on printing conditions (such as kinds of ink and printing paper). Therefore, in the conventional printing presses, a printed material is read with a color measurement console, etc. to measure actual print colors, and the amount of ink, damping water, etc. are adjusted on the printing press side so as to set the print colors to predetermined values, thereby managing the print colors.

On the other hand, a printing press comprising a printing plate recording device for directly forming an image on a printing plate based upon digital image data, i.e., a so-called CTP (Computer-To-Plate) system, have been put into practical use. As such a printing press equipped with a CTP device has been widely used, there are demands for skill-less color management processes for printed materials.

SUMMARY OF THE INVENTION

The present invention is directed to a method of managing print colors in a process for generating a printing plate on the basis of image data obtained by subjecting multi-value image data to RIP and carrying out printing by supplying ink on the printing plate.

According to the present invention, the method comprises: a recording step of recording a color chart on a printing plate; a step of determining a printing condition; a printing step of printing the color chart on a printing medium in accordance with the printing condition while using a printing press; a detecting step of detecting a print color on the color chart on the printing medium; a profile data generating step of generating profile data in accordance with printing characteristics of the printing press based upon the print color; and a profile data storage step of storing the profile data in association with the printing condition, the printing condition including at least one of I) an ink condition used in the printing press, and II) a condition of a kind of the printing medium.

When a printing process is newly carried out using the printing press in accordance with the printing condition, a color correction prior to a RIP process is carried out on multi-value image data with reference to the profile data.

In a preferred embodiment of the present invention, the printing press is operable to form an image on the printing plate being held on a printing cylinder.

Preferably, the printing condition further includes at least one of III) a condition of an amount of ink in the printing process, and IV) a condition of an amount of damping water.

In a preferred embodiment of the present invention, the detection of the print color is conducted with a color detector including an image-pickup placed in a transport path of the printing medium or in a discharging section of the printing medium inside the printing press.

The present invention is also directed to an image data processing device for applying a RIP process to a multi-value image data representing printing contents to obtain binary image data for recording an image on a printing plate to be used in a printing press.

According to the present invention, the image data processing device comprised: a storage memory storing profile data suitable for printing characteristics of the printing press with respect to each of a plurality of printing conditions; and a color converter reading profile data that matches a designated printing condition from the storage memory, and for carrying out a color conversion on the multi-value image data in accordance with the profile data, where the printing condition includes at least one of I) an ink condition used in the printing press, and II) a condition of the kind of the printing medium.

In accordance with the present invention, it is possible to carry out a color management in accordance with a profile even in the case of a printing press for performing a printing process through a printing plate.

In particular, when a digital printing press integrally provided with a plate generating system and a printing system is used, the color management is more easily carried out using the profile.

Accordingly, an object of the present invention is to carry out a color management by using profile data even in the case of a general printing press, such as an offset printing press.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an explanatory drawing that shows a state in which profile data is stored in association with printing conditions.

DESCRIPTION OF THE PREFERRED EMBODIMENTS

Figure 1:
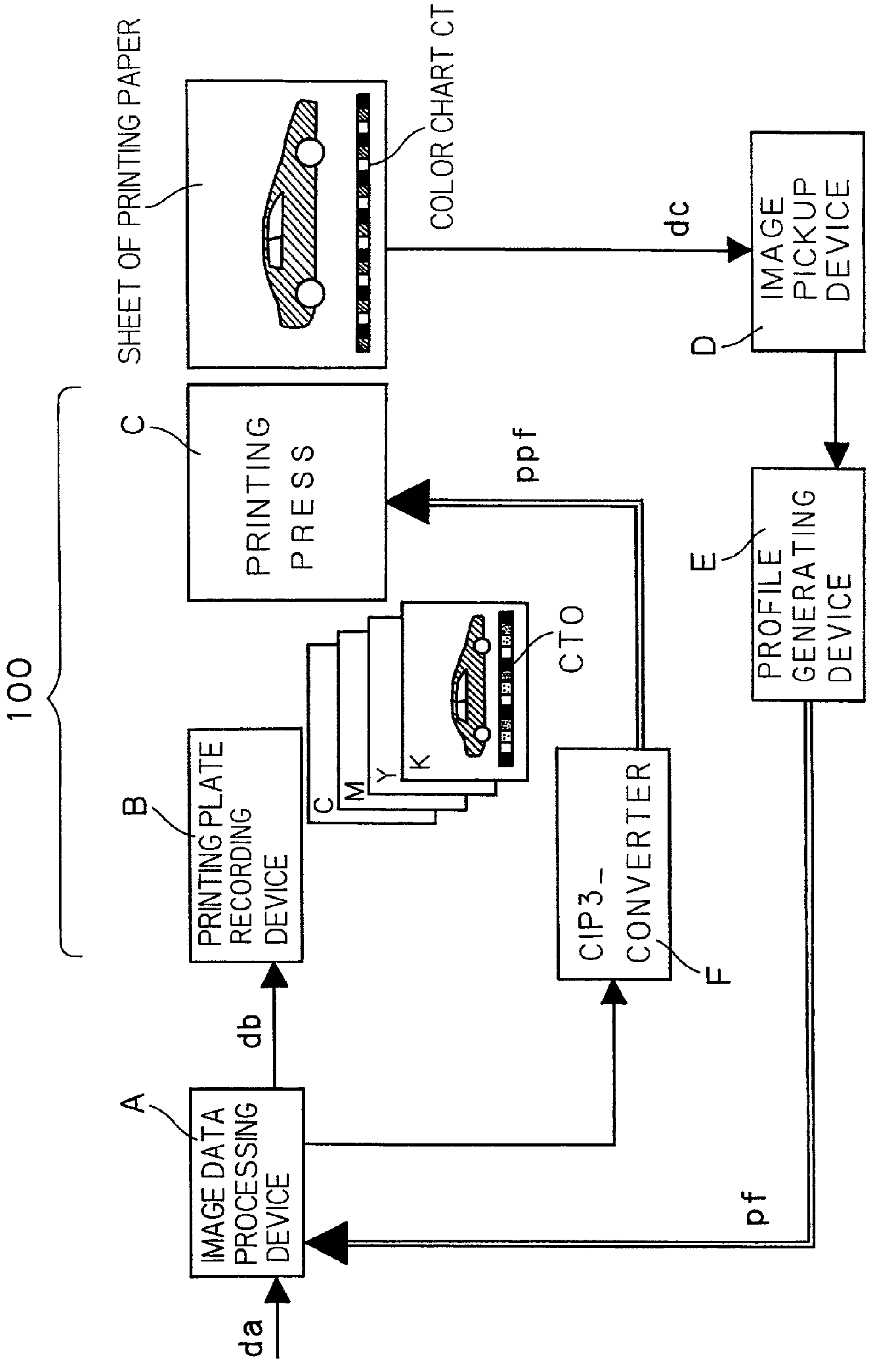
FIG. 1 is a block diagram that shows a structure of a plate-recording and printing system that achieves a color management in accordance with a preferred embodiment of the present invention.

FIG. 1 is a block diagram that shows a structure of a plate-recording and printing system that achieves a color management in accordance with a preferred embodiment of the present invention.

In FIG. 1, the plate-recording and printing system is provided with: an image data processing device A for processing image data such as characters and photographs; a printing plate recording device B for directly recording an image on a printing plate based upon the image data obtained in the image data processing device A; a printing press C for carrying out a printing process by using the printing plates thus formed; an image pickup device D for picking up an image of a printed material; and a profile generating device E for forming profile data for the printing press from the image data thus picked up.

The image data processing device A, which is a computer system that is provided with a CPU, various input-output devices and storage devices, etc., carries out a color-conversion process, which will be described later, and a RIP process on multi-value image data $d_a$ obtained by a DTP (Desk-Top-Publishing) system, to convert the image data $d_a$ into binary image data $d_b$ of a bitmap format. This image data processing device A will be discussed later in detail by reference to FIG. 6.

In this preferred embodiment, the printing plate recording device B and the printing press C are integrally formed into a printing press with a CTP system for recording an image on a printing plate wound around a plate cylinder, which is hereinafter referred to as “digital printing press 100”. The digital printing press 100 will be described later in detail with reference to FIG. 2.

In this preferred embodiment, the image pickup device D, which includes a CCD camera attached to the printing-paper discharging section of the printing press C, picks up a color chart CT (see FIG. 1) on which a plurality of colors are printed in different areas on a sheet of printing paper with a plurality of gradations, thereby obtaining image data $d_c$. This image pickup device D will be discussed later in detail with reference to FIG. 4.

The profile generating device E is a computer system which, based upon the image data $d_c$ picked up by the image pickup device D, discriminates a print color in each of the color areas on the color chart CT to generate profile data $p_f$ of the printing press, and the detailed description thereof will be discussed later with reference to FIG. 5.

A CIP3-converter F in FIG. 1 receives the multi-value image data that has been color-converted by the image data processing device A to generate data conforming to the CIP3 (International Cooperation for Integration of Prepress, Press, and Postpress) standard for adjustments of the ink amount. That is, the CIP3-converter F converts the multi-value image data prior to the RIP process, which is prepared for actually recording an image on the printing plate, into image data of a low resolution in the PPF (Print Production Format). The printing press C adjusts the amount of ink in response to the PPF data.

Figure 2:
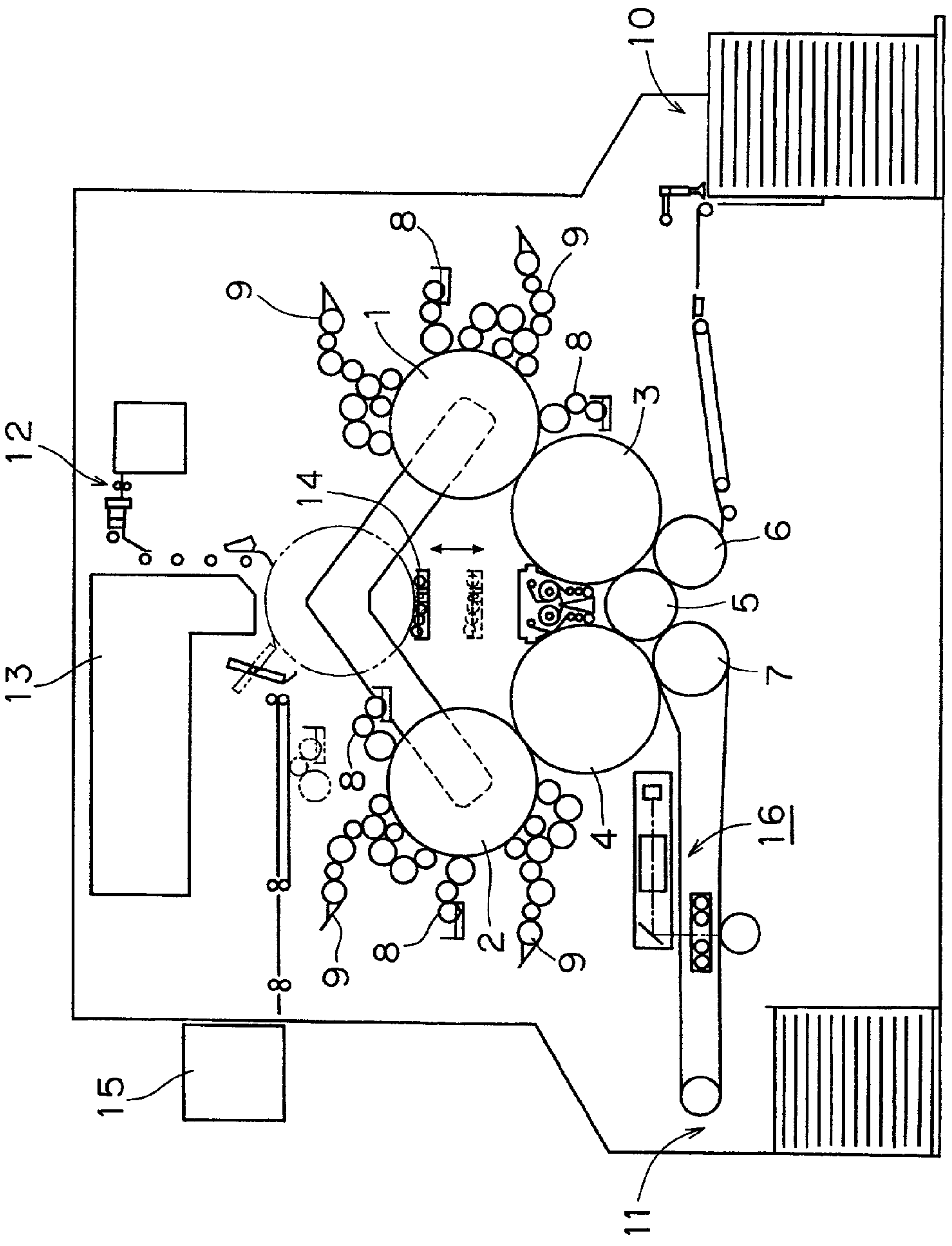
FIG. 2 is a schematic side view that shows a structure of a digital printing press used in the prepress-and-printing system.

Next, detailed explanations will be given of respective devices in the above-mentioned plate-recording and printing system. First, referring to FIG. 2, an explanation will be given of the digital printing press 100. FIG. 2 is a schematic side view that shows the outline of the digital printing press 100.

In FIG. 2, with respect to its printing mechanisms, the digital printing press 100 is provided with: first and second plate cylinders 1, 2 each of which holds a printing plate; first and second blanket cylinders 3, 4 for transferring ink images from the respective plate cylinders; an impression cylinder 5 holding a sheet of printing paper on which the ink images are to be transferred from the two blanket cylinders 3, 4; a feeding cylinder 6 and a discharging cylinder 7 for supplying/discharging a sheet of printing paper to/from the impression cylinder 5; a damping water supplying mechanism 8 and an ink supplying mechanism 9 for supplying damping water and ink to the printing plates on the first and second plate cylinders 1, 2; and a paper supplying section 10 for successively supplying sheets of unprinted printing paper that have been stacked; and a paper discharging section 11 for successively stacking sheets of printed paper.

On the other hand, with respect to plate generating mechanisms for generating printing plates, the digital printing press 100 is provided with: a printing plate supplying section 12 for supplying unexposed printing plates to the first and second plate cylinders 1, 2; an image recording section 13 for recording images on the printing plates on the plate cylinders 1, 2; a developing section 14 for developing the printing plates on which the images have been recorded; and a printing plate discharging section 15 for discharging the used printing plate. Moreover, the digital printing press 100 is provided with an image pickup section 16 serving as an image pickup device D for picking up an image on the printing paper.

The details of the respective parts are as follows: The first plate cylinder 1 is shifted by a plate cylinder driving mechanism between a first printing position indicated by a solid line and an image recording position indicated by an alternate long and two short dashes line as shown in FIG. 2, and in the same manner, the second plate cylinder 2 is also shifted by the plate cylinder driving mechanism (not shown) between a second printing position indicated by a solid line and the image recording position indicated by the alternate long and two short dashes line as shown in FIG. 2. In other words, the first and second plate cylinders 1, 2 are placed at the first or second printing position respectively when a printing process is executed, and also alternately placed at the image recording position successively to be subjected to a plate generating process for the printing plates on the respective plate cylinders, when a plate generating process for a printing plate is executed. Each of the first plate cylinder 1 and the second plate cylinder 2 has a circumferential surface capable of holding printing plates of two colors, and is provided with two pairs of pinching means for fixing the respective printing plates to positions opposing to each other with 180 degrees on the circumferential surface. One printing plate having two printing areas may be used in place of the two printing plates attached to each plate cylinder. One printing plate having two printing areas may be used in place of the two printing plates attached to each plate cylinder.

The first blanket cylinder 3 is arranged to rotate while contacting the first plate cylinder 1 at the first printing position, and in the same manner, the second blanket 4 is arranged to rotate while contacting the second plate cylinder 2 at the second printing position. Each of the first and second blanket cylinders 3, 4 has the same diameter as the first and second plate cylinders 1, 2 and blankets capable of transferring ink images of two colors from each plate cylinder are attached to its circumferential surface.

The impression cylinder 5 has a diameter that is a half of that of the first and second plate cylinders 1, 2, and is allowed to rotate while contacting both of the first and second blanket cylinders 3, 4. The impression cylinder 5 has a pinching means capable of holding a sheet of printing paper having a size corresponding to the printing plate. This pinching means is allowed to open and close at predetermined timing by an opening and closing mechanism so that the leading edge of the sheet of printing paper is sandwiched and held.

The paper supplying cylinder 6 and the paper discharging cylinder 7 have the same diameter as the impression cylinder 5, and are provided with pinching means that are the same as those of the impression cylinder 5. Each of the pinching means of the paper supplying cylinder 6 and the paper discharging cylinder 7 are arranged so as to pass and receive a sheet of printing paper in synchronism with the operation of the pinching means of the impression cylinder 5.

With respect to the first and second plate cylinders 1, 2, placed at the first and second printing positions, the first and second blanket cylinders 3, 4, the impression cylinder 5 and the paper supplying cylinder 6 and the paper discharging cylinder 7, driving gears, which have diameters that have the same sizes as those of the corresponding cylinders, are attached to the respective cylinder on their respective ends, and these gears engage with each other between the contacting cylinders. Therefore, these gears are driven by a driving motor so that the respective cylinders are driven to rotate in synchronism with each other.

In the printing press according to the preferred embodiment, the plate cylinders 1, 2 and the blanket cylinders 3, 4 have a circumferential length two times the circumferential length of the impression cylinder 5 so that the impression cylinder rotates twice each time the plate cylinders 1, 2 and the blanket cylinders 3, 4 rotate once. Therefore, while the impression cylinder 5 rotates twice with printing paper held thereon, the first and second plate cylinders 1, 2 provide a multi-color printing operation with the total four colors, every two colors being derived from each cylinder.

Two pairs of the damping water supplying means 8 are provided for each of the plate cylinders 1, 2 at the first and second printing positions so that damping water is selectively supplied to the two printing plates on the respective plate cylinders 1, 2. Each damping water supplying means 8 is provided with a water pan storing damping water and a group of damping-water rollers that draw damping water from the water pan to pass it to the surfaces of the printing plates. At least the damping water rollers that contacts the printing plate surface is arranged so as to come into contact with or separate from the surface of the plate cylinder by a cam mechanism. In the case when the printing plates of a type that needs no damping water are used, the damping water supplying means 8 are omitted.

Two pairs of the ink supplying means 9 are provided for each of the plate cylinders 1, 2 at the first and second printing positions so that ink of a different color is selectively supplied to each of the two printing plates on the plate cylinders 1, 2. For example, in this preferred embodiment, the ink supplying means 8 of K-color (black) and M-color (magenta) are placed on the first plate cylinder 1, and the ink supplying means 8 of C-color (cyan) and Y-color (yellow) are placed on the second plate cylinder 2.

Additionally, some of the damping water supplying means 8 and the ink supplying means 9 are designed so that, when the first and second plate cylinders 1, 2 are shifted, they are allowed to retreat from their shifting paths.

Figure 3:
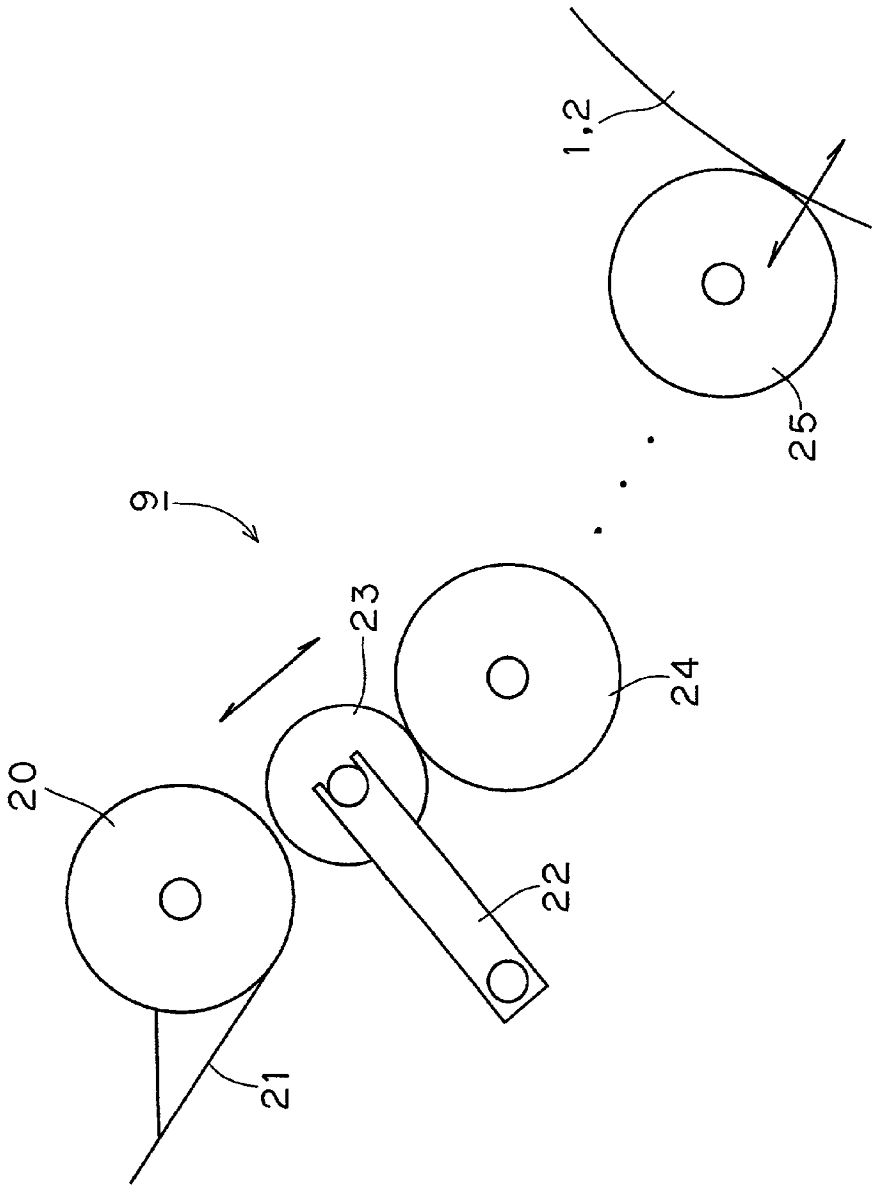
FIG. 3 is a schematic side view that shows a structure of an ink supplying means of the digital printing press.

Referring to FIG. 3, the structure of the ink supplying means 9 will be described. FIG. 3 is a schematic side view that shows one example of the ink supplying means 9. In FIG. 3, the ink supplying means 9 is provided with: an ink fountain roller 20 and an ink key 21 that constitute an ink fountain device; an ink transfer roller 23 that is allowed to freely rock by an arm 22; a plurality of ink rollers 24; and an ink form roller 25 that contacts the surface of the printing plate to supply ink thereto. In FIG. 3, only one ink roller 24 is shown.

The ink fountain device has an arrangement in which the ink key 21 formed by a metal thin plate is made in contact with the circumferential surface of the ink fountain roller 20 that is installed along the axis line of the plate cylinder The ink key 21 is divided into a plurality of portions along the axis line direction of the ink fountain roller 20. Ink is stored in an ink groove space formed by the ink fountain roller 20, the ink key 21 and a side plate (not shown).

Each ink key 21 is designed so as to be driven in the contacting or departing direction to or from the surface of the ink fountain roller 20 independently by a driving screw and other elements, whereby the gap (the degree of the opening) between the ink fountain roller 20 and the ink key 21 can be adjusted. When the ink fountain roller 20 is rotated counterclockwise in FIG. 3, the ink is released onto the surface of the ink fountain roller 20 in the form of a layer having thickness corresponding to the degree of the opening.

The ink transfer roller 23 is reciprocally moved between the ink fountain roller 20 and the ink roller 24 by the shift of the arm 22 so that it is allowed to alternately contact the ink fountain roller 20 and the ink roller 24. The ink on the ink fountain roller 20 is transferred onto the ink roller 24.

The ink roller 24 has an arrangement in which a plurality of rollers made of metal or rubber successively come into contact with each other, and some of these rollers are allowed to shift and rock in the roller axis direction. An ink kneading operation is carried out by the ink roller.

The ink form roller 25 is allowed to come into contact with or separate from the circumferential surface of the first plate cylinder 1 or the second plate cylinder 2 by a cam mechanism while contacting at least one of the ink rollers 24. Thus, it is possible to supply ink having a color suitable for the corresponding printing plate on the plate cylinder.

The ink supplying means 9 makes it possible to control the amount of supply of ink having each color along the axis line direction (the direction orthogonal to the printing direction) of the plate cylinder by adjusting the degree of the opening of the ink key 21. The degree of opening of the ink key 21 is calculated based upon the PPF data supplied by the CIP3-converter F.

Referring again to FIG. 2, the paper feeding section 10 is designed to pick up sheets of printing papers sheet by sheet from a stack of unused printing papers and to pass each sheet of printing paper to the feeding cylinder 6. In this preferred embodiment, it is operated so as to supply a sheet of printing paper once every two rotations of the feeding cylinder. Moreover, the paper discharging section 11 receives sheets of printed paper from the paper discharging cylinder 7, and stacks these sheets of printed paper. The paper discharging section 11 will be described later in detail.

Next, an explanation will be given of the plate generating mechanism of the digital printing press 100. Upon executing the plate generating process, the printing press shifts the first and second plate cylinders 1, 2 alternately to the image recording positions. At the image recording positions, a friction roller (not shown) is driven to rotate while kept in contact with the plate cylinder.

The printing plate supplying section 12 is provided with: a cassette roll that stores a roll of unexposed printing plate in a manner so as to be shielded from light; a transport roller and a transport guide for transporting a drawn printing plate to the plate cylinders 1, 2; and a cutting means for cutting the printing plate into a sheet shape. In this preferred embodiment, plates on which a silver salt photosensitive material is provided are used as the printing plates, and images are recorded thereon through selective application of a laser light beam. With respect to the sequence of the printing-plate supplying processes, first, the leading edge of the printing plate drawn from the cassette roll is pinched by the pinching means of the plate cylinders 1, 2, and in this state, the plate cylinders 1, 2 are rotated so as to wind the printing plate around the plate cylinders 1, 2. Thereafter, the printing plate is cut to a predetermined length and the rear end of the printing plate is pinched by the other pinching means.

The image recording section 13 applies laser light on the printing plate while turning-on and -off the laser light, thereby recording an image thereon. In this preferred embodiment, a laser light beam emitted from a laser source is allowed to scan in the axis line direction of the plate cylinder by using a light deflecting device such as a polygon mirror while the plate cylinder is being rotated so that the surface of the printing plate is scanned. With respect to the printing plate and the image recording section 13, not only those materials on which an image is formed through exposure, but also materials on which an image is formed through heat or a discharging process may be used.

In the image recording section 13, upon recording an image on the printing plate, a color chart CT0 is recorded on a margin portion provided on the periphery of the printing plate. This color chart CT0 is made by forming a train of color areas in which step-like gradations of color are represented with halftone dots for each of the color components YMCK. The graduation of the color chart CT0 is preliminarily set to known values so that the reference colors of each color chart are determined in a predetermined color system, for example, L*a*b* color system (hereinafter, referred to as "Lab color system").

The developing section 14 develops the printing plates exposed to light in the image recording section 13. In this preferred embodiment, the developing section 14 has an arrangement in which processing liquid stored in a processing vessel is drawn by an applying roller, and is applied to the printing plate so as to carry out the developing process. An elevator means for shifting the developing device to a retreated position from the plate cylinder or to a position close to the plate cylinder is installed. The developing section 14 may be omitted in the case where an image is recorded without developing process.

In the digital printing press 100, the first and second plate cylinders 1, 2 are shifted to the image recording position so that the plate generating operation is carried out through the supply of the printing plate, the image recording on the printing plate and the development of the image. Upon completion of the plate generating operation, the first and second plate cylinders 1, 2 are shifted to the first and second printing positions so as to be ready for a printing operation.

Upon completion of the printing operation, the digital printing press 100 automatically discharges the printing plate. In this preferred embodiment, the printing plate discharging section 15 is provided with: a separation means for separating the printing plate from the plate cylinder that is at the image recording position; a transport means for transporting the separated printing plate; and a discharging cassette for discharging the used printing plate thus transported.

Figure 4:
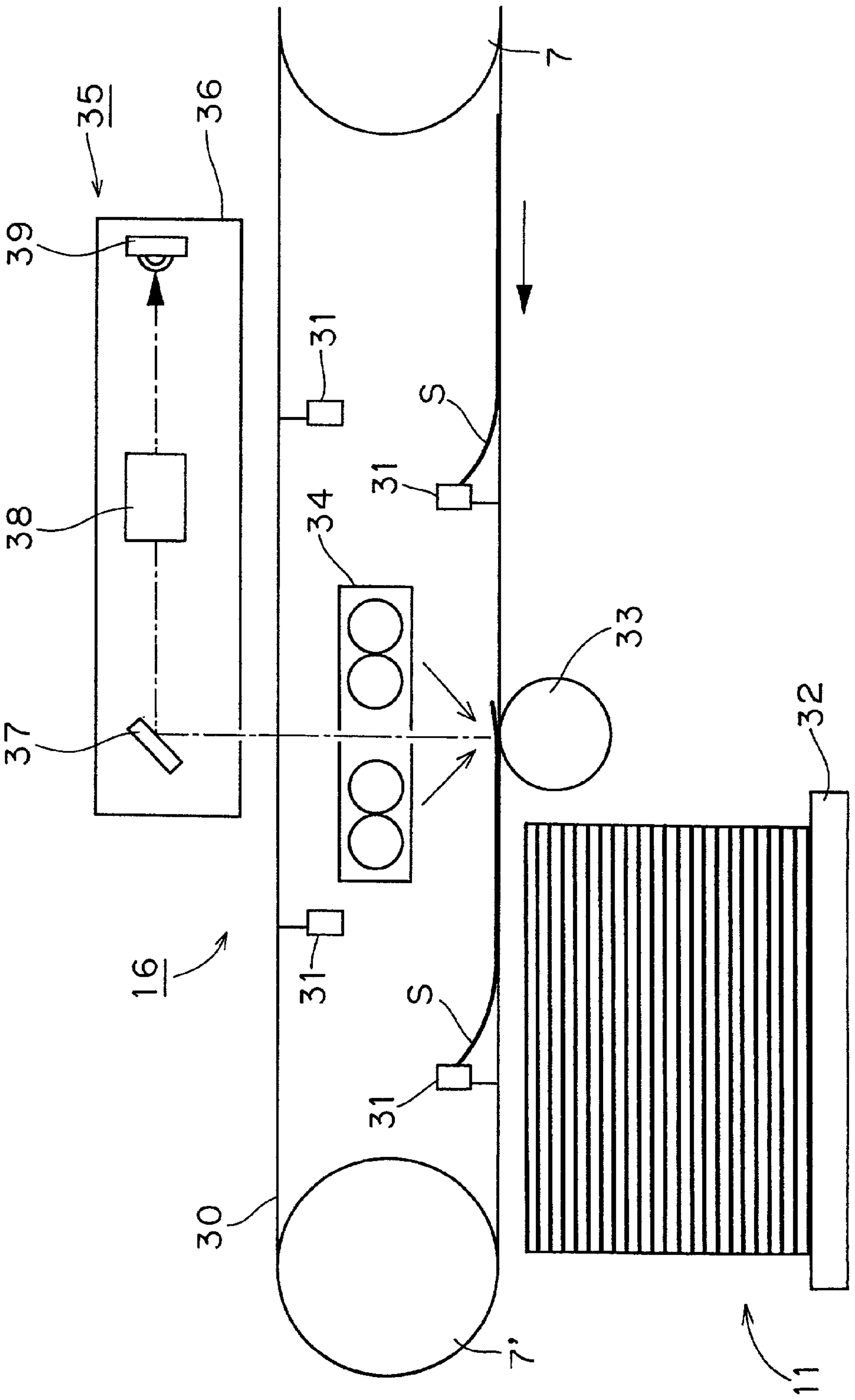
FIG. 4 is a schematic side view that shows structures of a paper discharging section and an image pickup section in the digital printing press.

Next, referring to FIG. 4, the structures of the image pickup section 16 and the paper discharging section 11 will be described. FIG. 4 is a schematic side view that shows the outline of the vicinity of the paper discharging section 11.

The paper discharging section 11 is constituted by the paper discharging cylinder 7, two endless chains 30 that have been passed over the two gears 7' that have the same diameter as the paper discharging cylinder 7, a plurality of pinching means 31 for transporting a sheet of paper S that are transported by the two chains, and a paper discharging base 32 on which sheets of printing paper S transported by the pinching means 31 are stacked.

Gear sections that engage the respective chains 30 are attached to the two ends of the paper discharging cylinder 7, and two gears 7', having virtually the same diameter, are placed face to face with these gear sections. The endless chain 30 is passed over the gear section of the paper discharging cylinder 7 and the gear 7'. The length of the chain 30 is set to an integral multiple of the circumferential length of the paper discharging cylinder.

The pinching means 31 has a claw member capable of opening and closing so as to pinch the leading edge of a sheet of paper S, and a plurality of pinching means 31 are fixed between the two chains. The interval of the pinching means corresponds to the circumferential length of the paper discharging cylinder 7. Therefore, as the paper discharging cylinder 7 rotates, the pinching means 31 are allowed to travel in a loop manner in synchronism therewith. The pinching means 31, which are allowed to open and close in synchronism with the pinching means placed on the paper discharging cylinder 7 by a cam mechanism, receive a sheet of printing paper S from the paper discharging cylinder 7, and discharge the sheet of printing paper S onto the paper discharging base 32.

The paper discharging base 32 is a pallet-shaped member on which a plurality of sheets of printed paper S are stacked, and is shifted up and down by an elevator means. In other words, as sheets of printing paper S are discharged, the paper discharging base 32 is allowed to successively go down so that the discharging height of the sheets of printing paper S is maintained constant, thereby making it possible to smoothly carry out the discharging operation of each sheet of printing paper S.

In the paper discharging section 11, although a sheet of printing paper S is transported with its leading edge pinched by the pinching means 31, the rear edge of the sheet of printing paper S is in an idle state without being fixed. Therefore, along with the transporting operation, the sheet of printing paper S becomes unstable. In this preferred embodiment, in order to suppress the unstable state of the sheet of printing paper S, a suction roller 33 for making the transporting state of the sheet of printing paper S stable is installed on the front side of the paper discharging base 32.

This suction roller 33 is provided with a number of fine suction holes on its surface, and is connected to a vacuum pump. The suction roller 33 is placed with its roller axis line in parallel with the pinching means 31 so that the roller top portion is positioned at virtually the same height as the lower passage position of the chain 30. The suction roller 33 may be driven to rotate in accordance with the passing speed of the pinching means 31, or may be arranged so as to freely rotate. Thus, upon passage over the suction roller 33, a sheet of printing paper S is transported while being sucked onto the surface of the suction roller, and therefore, the sheet of printing paper S is free from the unstable state over the portion of the suction roller 33. In place of the suction roller 33, a suction plate member that sucks the sheet of printing paper S flatly may be adopted.

The image pickup section 16 is constituted by an illuminating means 34 for illuminating a sheet of printed paper being transported, and an image pickup means 35 for picking up an image on the illuminated sheet of printed paper so as to obtain image data.

This illuminating means 34 is constituted by a plurality of stripe-shaped light sources for illuminating a sheet of printed paper on the suction roller 33 along the suction roller 33, and installed in an up and down shifting range of the chains 30. An image-pickup slit is formed in the center portion of each light source.

The image pickup means 35 is constituted by a box-shaped member 36 for shielding it from light and for protecting it from dusts, and a mirror 37, a lens 38 and a CCD line sensor 39 placed inside the box-shaped member. The image pickup means 35 picks up an image on the sheet of printed paper on the suction roller 33 through a slit in the illuminating means 34, and the incident light of the image, reflected by the mirror 37, is received by the CCD line sensor 39 through the lens 38. The, the CCD line sensor reads the image for three color components of RGB (Red, Green, Blue).

In this preferred embodiment, the color chart CT printed on the sheet of printed paper is read for each scanning line in synchronized timing with the transport of the sheet of printed paper. In another preferred embodiment, the image of the sheet of printed paper discharged onto the paper discharging base 32 may be picked up by a two-dimensional CCD camera, etc., so that the colors on the color chart CT is measured. Moreover, the operator may take out the sheet of printed paper onto a color measurement console separately prepared so that the colors of the color chart CT is measured.

Figure 5:
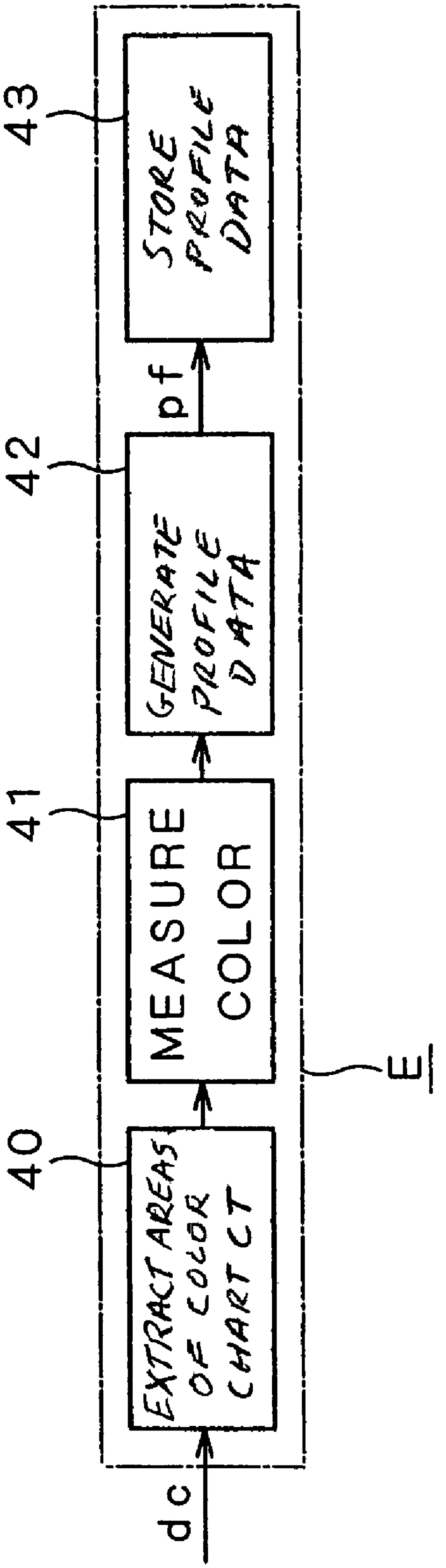
FIG. 5 is a block diagram that shows a functional construction of a profile forming device used in the plate-recording and printing system.

Next, referring to FIG. 5, the profile generating device E will be now described. FIG. 5 is a functional block diagram that shows the functions of the profile forming device.

The profile generating device E, which is formed by a microcomputer system having a CPU, various input-output means, storage means, etc., is provided with functional parts shown in FIG. 5, such as: a color chart extraction means 40 for extracting areas of the color charts CT from image data $d_c$ picked up by the image pickup section 16; a color measuring means 41 for measuring colors of the color charts CT that have been extracted; a profile data computing means 42 for generating profile data from the measured print colors; and a profile data storage means 43 for storing the profile data thus generated in association with printing conditions.

The color chart extraction means 40 carries out an image-processing operation on the image data $d_c$, and discriminates the relative position of each color chart CT based upon the register mark or the position of the edge of the color chart CT that has been picked up.

The color measuring means 41 calculates the image data $d_c$ for each color chart CT area that has been extracted so as to find a Lab color value of each color area of the color charts CT. Actually, since the image data $d_c$ obtained from the image pickup section 16 is represented in RGB-color system, the image data $d_c$ is converted to the Lab color system in accordance with a predetermined profile. Thus, the print color of each color area of the color charts CT that have been actually printed is obtained as a color value in the Lab color system.

The profile data computing means 42 generates profile data $p_f$ based upon digital data respectively representing each print color of the color chart CT obtained by the color measuring means 41 and the predetermined reference colors of the color chart CT. In other words, the profile data $p_f$ is a conversion table for color-converting image data so as to allow a print color to be actually printed to coincide with the reference color based upon the color chart.

For example, now suppose that an actual print color c1 is obtained when a plate printing operation is carried out by using image data d0 corresponding to a reference color c0 while an actual print color c2 is obtained when a plate printing operation is carried out by using image data d1 corresponding to a reference color c1 (see the following Relations R1 and R2).

Relation R1: d0 (c0)—(Print)—>c1

Relation R2: d1 (c1)—(Print)—>c2

Relation R3: d1—(Conversion)—>d0—(Print)—>c1

In accordance with Relations R1 and R2, in the case when the reference color c1 is desired to be actually printed, the image data d0 rather than the image data d1 should be used in the printing plate recording device and/or the printing press. Therefore, based upon the profile data $p_f$, the image data d1 corresponding to the reference color c1 is color-converted to the image data d0 corresponding to the reference color c0 (see Relation R3).

The profile data storage means 43 is operable to store the generated profile data $p_f$ in association with printing conditions such as ink and the kind of a sheet of printing paper. For example, in general, the kinds of ink and sheets of printing paper to be used by each user are preliminarily limited. Therefore, in this profile generating device E, the operator is allowed to select and input the kinds of ink and sheets of printing paper to be used from the predetermined selectable items. Then, the profile data storage means 43 stores the profile data $p_f$ in a data base format, for example, as shown in FIG. 7.

In other words, this data base is provided with a first storage area (a first column and a second column in FIG. 7) for storing a plurality of printing conditions and a second storage area (a third column in FIG. 7) for storing a plurality of profile data corresponding to printing characteristics of the printing press, in association with each of the printing conditions.

In the case when such profile data $p_f$ is generated, it is preferable for the printing press C to carry out its printing operation by setting the amount of damping water and the amount of ink to predetermined reference values as preliminarily defined. This is because the variable amounts of damping water and ink cause variations in print colors to be reproduced. In other words, in the case of the conventional arrangement, the print colors are managed only by adjusting the amounts of damping water and ink in the printing press C, which causes a difficulty in managing the printing press C. In contrast, in this preferred embodiment, the amount of damping water and the amount of ink are set to the reference values as closely as possible, and the color management is carried out by using the profile data $p_f$ in the same manner as digital apparatuses such as color printers.

In addition to the management for the print colors using the profile data $p_f$, the adjustments of the amounts of ink and damping water may be also used. For example, the amount of damping water may be increased so as to make the print colors thinner as a whole. Such adjustments of the amount of damping water may be achieved, for example, by controlling the number of rotations and the nip pressure of the damping water roller in the water pan of the damping water supplying means 8. Therefore, in the adjustment of the damping water, the number of rotations and nip pressure may be set as the adjustable values.

In the case when the amount of damping water and the amount of ink are adjusted in this manner, it is preferable for the profile data storage means 43 to store the profile data $p_f$ in association with the adjustable values of the amount of damping water and the amount of ink. Then, the printing press makes adjustments to the amount of damping water and the amount of ink in association with the profile data $p_f$.

Figure 6:
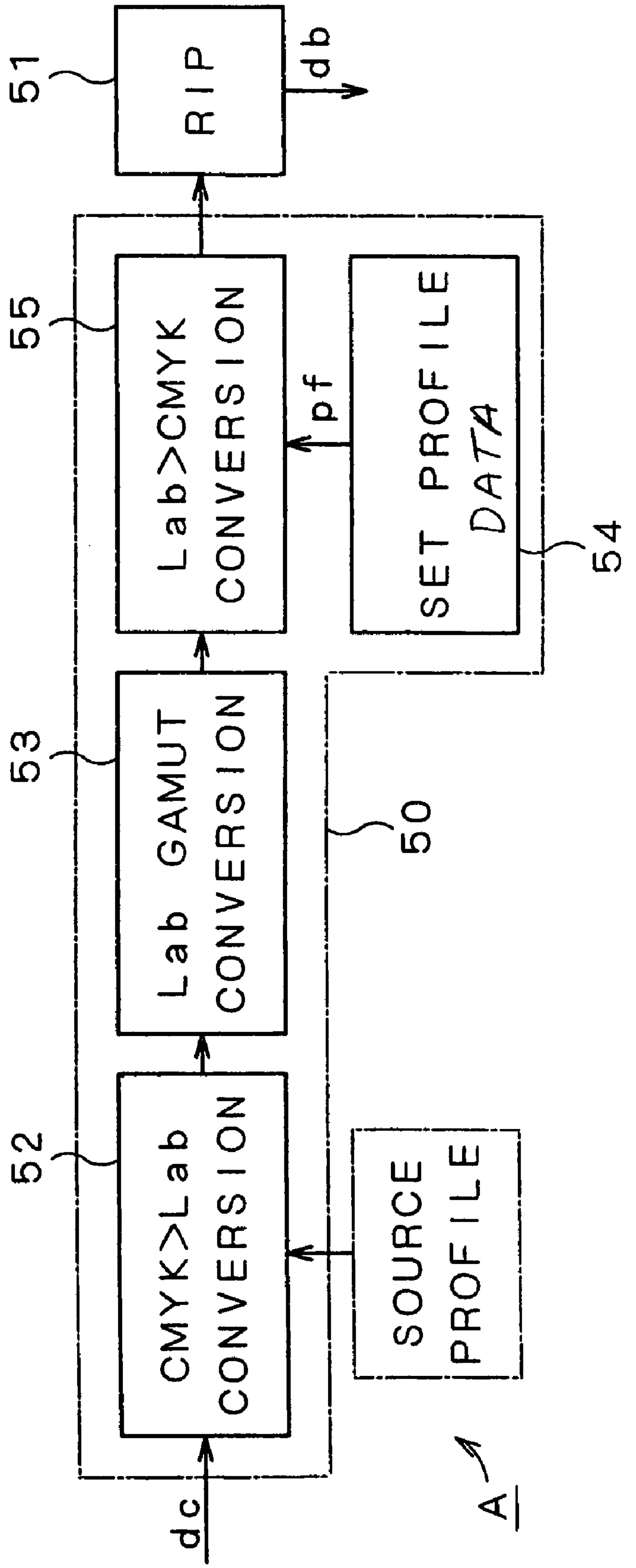
FIG. 6 is a block diagram that shows a functional construction of an image data processing device used in the plate-recording and printing system.

Next, the construction of the image data processing device A will be described. FIG. 6 is a functional block diagram that shows the construction of the image data processing device A. As shown in FIG. 6, the image data processing device A is constituted by a color conversion means 50 and a RIP processing means 51.

This color conversion means 50, which converts image data based upon the profile data $p_f$, is constituted by a CMYK/Lab conversion means 52, a Lab GAMUT conversion means 53, a profile data setting means 54 and a Lab/CMYK conversion means 55.

The CMYK/Lab conversion means 52 converts multi-value CMYK image data $d_a$ to data in the Lab color system. In general, upon conversion of this type, a correction is carried out in accordance with a profile (source profile) corresponding to the device for outputting the image data $d_a$. This source profile may be prepared based upon a known image data forming device.

The Lab GAMUT conversion means 53 is used for making GAMUTS (color solids) inherent to respective devices coincident with each other. In other words, in some cases, it is not possible to reproduce all the colors represented by the original image data $d_a$ by using the printing press C. The Lab GAMUT conversion means 53 corrects the difference in color expressions inherent to the device.

For convenience of explanation, the following description will use simplified expressions. For example, now suppose that the reproduction ranges of a specific color on the input side are ranges A0 to Ar, and that the reproduction ranges of the specific color on the output side are ranges A0 to Aq. For example, if r>q, the colors exceeding the number q are not reproduced on the output side. Therefore, in the Lab GAMUT conversion section 53, a color-range conversion is carried out so as to reproduce the reproduction ranges A0 to Ar on the input side in the reproduction ranges A0 to Aq on the output side. In other words, in accordance with a predetermined coordinate conversion table, the Lab GAMUT conversion means 53 converts the color coordinates on the input side to color coordinates that can be reproduced on the printing side.

The profile data setting means 54 sets printing conditions, such as the kind of a printing press C and the kinds of ink and sheets of printing paper to be used, by using an input means such as a key board and a mouse, and the profile data $p_f$ stored in association with these printing conditions is read from the profile data generating device E.

The Lab/CMYK conversion means 55 converts image data of colors represented by the Lab color system to those in the CMYK. In this conversion, a correction is made by using the profile data $p_f$ generated in the profile generating device E, while the conversion is made to CMYK.

The RIP processing means 51 applies a RIP-process to the multi-value image data of CMYK after having been subjected to the color correction through the conversion of the Lab/CMYK conversion means 54 so as to convert the same to binary image data $d_b$ for each color component. In the RIP process, image conversion to halftone dots adapted to offset printing is also carried out.

In the image data processing device A, actual printed colors are detected to generate the profile data $p_f$, which is stored in association with the kinds of the ink and the sheet of printing paper used. Therefore, in the case when the same ink and sheets of printing paper are used, the printing press C can be managed by using the profile data $p_f$ in the same manner as digital apparatuses such as color printers.

Moreover, in this preferred embodiment, since color managements are carried out based upon the actual printed colors, it is not necessary to carry out a dot-gain correction that has been required in conventional printing presses. In the conventional devices, with respect to the relationship between a plate generating device and a printing press, the dot-gain correction has been carried out in which a dot density (dot percent) is preliminarily reduced and corrected on the plate generating device side by taking into consideration a dot gain at the time of printing. In general, this dot-gain correction has been considered only to compensate change in the dot percentage, and has been carried out separately from color matching.

However, in this preferred embodiment, the change in the dot percentage due to the dot gain is represented by a change in colors of a printed material, and, the color correction by using the profile data $p_f$ virtually includes the dot-gain correction. The same is true for the screen gradation correction concerning the relationship between the exposing intensity and the dot percentage at the time of exposing a photosensitive material. As described above, in the present invention, the dot-gain correction and the screen gradation correction are also managed by the color management of the profile data $p_f$ in a unified manner.

Figure 8:
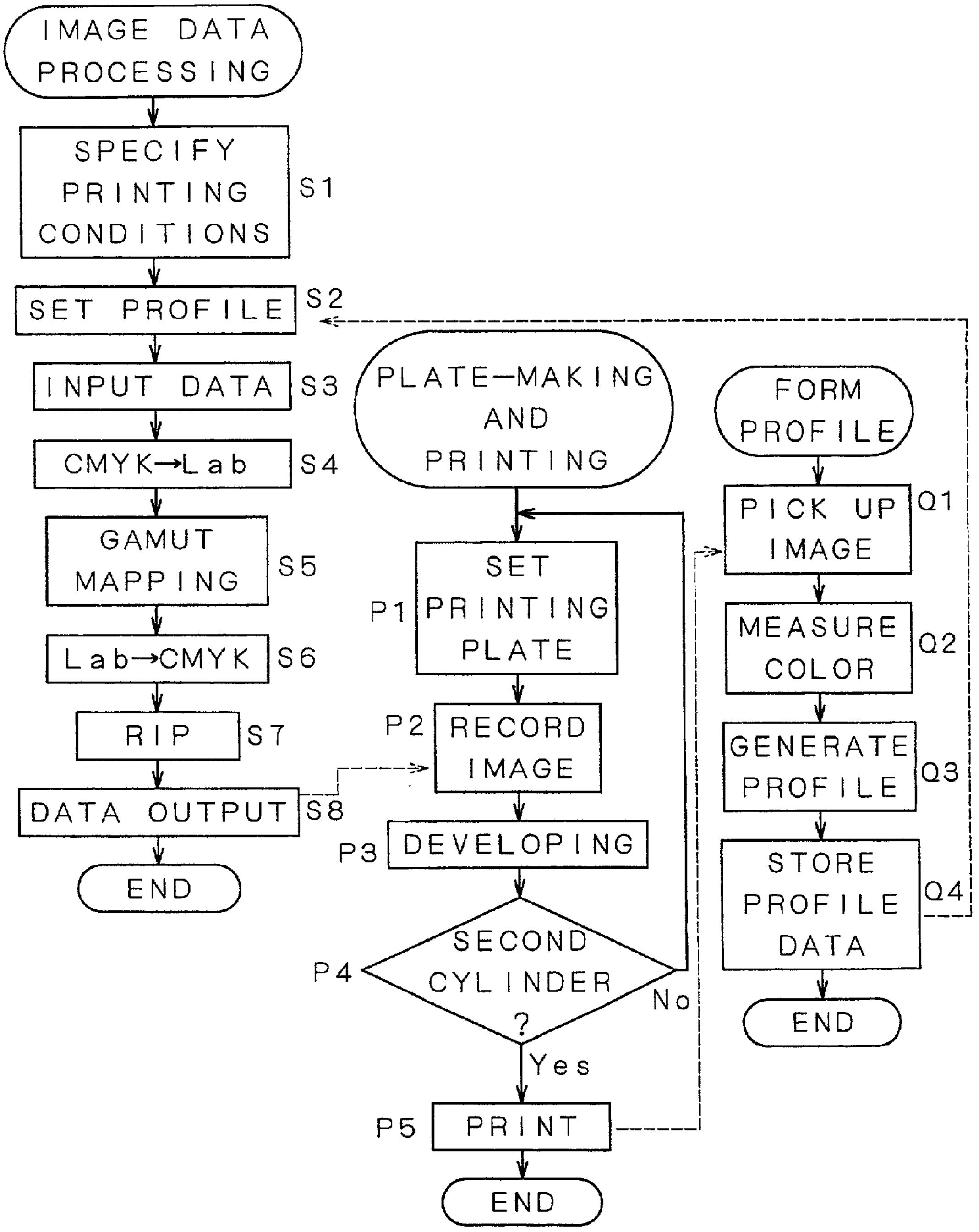
FIG. 8 is a flow chart that shows a sequence of printing color managing processes in the plate-recording and printing system.

Referring to a flowchart of FIG. 8, the sequence of color managing processes in the present plate-recording and printing system according to the preferred embodiment of the present invention will be described.

First, in the image data processing device A, printing conditions are designated at step S1. With respect to the printing conditions, for example, the kinds of ink and sheets of printing paper to be used are designated or selected.

At step S2, the profile data $p_f$, preliminarily stored in association with the printing conditions, is read and set. If no profile data $p_f$ related to the printing conditions is available, preset reference profile data is utilized as a default profile. Also, a preset profile is properly set with respect to the source profile on the input apparatus side for executing the input of image data.

At step S3, image data is read from the input apparatus side. In this preferred embodiment, this image data is multi-value image data in the CMYK format.

At step S4, based upon the source profile, the image data in the CMYK format is converted to color-corrected data in the Lab color system.

At step S5, the resulting image data in the Lab color system is converted by the Lab GAMUT conversion means 53 to color coordinates that can be reproduced by the printing press C.

At step S6, based upon the profile data $p_f$, image data in the Lab color system is converted to color-corrected image data in the CMYK format.

At step S7, a RIP process is applied to the resulting multi-value image data of CMYK to convert the same to binary image data for each of the CMYK colors.

At step S8, the binary image data thus obaimed is sent to the digital printing press 100.

In the digital printing press 100, first, at step P1, either the plate cylinder 1 or the plate cylinder 2 is shifted to the plate generating position and an unexposed printing plate is attached thereto.

Next, at step P2, an image is recorded based upon the binary image data. Here, in this preferred embodiment, images of two colors are successively recorded on one plate cylinder.

At step P3, the recorded printing plate is developed. After the developing process, the plate cylinder is returned to the printing position.

At the next step P4, a judgment is made as to whether or not the plate generating processes are completed on the two plate cylinders 1 and 2. In the case when either of the plate generating processes has not been finished, the sequence returns to step P1, thereby continuing the plate generating process.

Upon completion of the plate generating operation of the two cylinders 1, 2, a printing operation is executed at step P5.

The sequence of processes of the profile generating device E is as folows: First at step Q1, the images of the respective areas of color charts CT on a sheet of printed paper printed by the digital printing press 100 are read by the image pickup section 16.

At step Q2, from image data representing the respective colors in the areas of the respective colors of the color charts CT obtained, print colors of the respective chart areas are calculated and are expressed by numeric values in the Lab color system.

At step Q3, based upon the resulting actual printed colors of the respective areas of the color chart, profile data $p_f$ representing the printing characteristics of the printing press is obtaimd.

At step Q4, the profile data $p_f$ is stored in association with printing conditions of the printing pressesuch as the kinds of ink and sheets of printing paper. The printing conditions may be inputted by the operator, or may be preliminarily set on the printing presseside and transferred to the profile generating device E. The profile data $p_f$ stored in step Q4 is properly selected at the step S2 so as to be used at the time when the image data processing device A next processes the image data.

In place of the routines having been described , the present invention may be modified and carried out in the following manner.

In place of the integrated digital printing press 100 is adopted, individual printing plate recording device B and printing press C may be used. Nevertheless, it is most preferable to use the integrated digital printing press 100 since the printing press C to be used with the printing plate recording device B is fixed. In other words, processes from the plate generating to the printing are consistently carried out so that the number of combinations between the plate generating conditions and the printing conditions decreases, making it possible to easily carry out the color management by the use of profile data $p_f$.

In place of the digital printing press having the arrangement in which the printing plates are held on the plate cylinder, a digital printing press in which the plate cylinder itself serves as a printing plate may be utilized.

In the case when a printing press is selected and used among a plurality of kinds of printing presses and respective printing presses have mutually different printing characteristics, the profile data $p_f$ may be preferably stored in association with the kinds of printing presses.

While the invention has been shown and described in detail, the foregoing description is in all aspects illustrative and not restrictive. It is therefore understood that numerous other modifications are variations can be devised without departing from the scope of the invention.

What is claimed is:

1. A method of managing print colors in a process for carrying out printing while using a printing press, said printing press including plate generating mechanisms for recording a printing plate on the basis of image data obtained by subjecting multi-value image data to RIP and printing mechanisms for carrying out printing by supplying ink on said printing plate, said method comprising:

a step of determining a first printing condition including at least one of an ink kind condition and a condition of a kind of a printing medium used in said printing mechanisms;

a recording step of recording a color chart on a printing plate while using said plate generating mechanisms;

a printing step of adjusting a second printing condition including at least one of a condition of the amount of said ink and a condition of the amount of damping water, and printing said color chart on a printing medium in accordance with said first printing condition while using said printing mechanisms;

an image pickup step of picking up an image of said printing medium which is transported with its leading edge being pinched and its rear edge being sucked;

a detecting step of detecting a print color on said color chart on said printing medium from image data obtained by the image pickup step;

a profile data generating step of generating profile data in accordance with characteristics of both of said plate generating mechanisms and said printing mechanisms of said printing press based upon said print color; and a profile data storage step of storing said profile data in association with both of said first and second printing conditions, wherein, when a printing process is newly carried out using said printing press in accordance with said first printing condition, a color correction prior to a RIP process is carried out on multi-value image data with reference to said profile data, and at least one of said condition of the amount of said ink and said condition of the amount of said damping water is adjusted in accordance with said second printing condition in association with said profile data.

2. The method according to claim 1, wherein said plate generating mechanisms are operable to form an image on said printing plate being held on a plate cylinder.

3. A plate-recording and printing system comprising a printing press, said printing press including plate generating mechanisms for recording a printing plate on the basis of image data obtained by subjecting multi-value image data to RIP and printing mechanisms for carrying out printing by supplying ink on said printing plate, said plate-recording and printing system further comprising:

a printing condition setting element setting a first printing condition including at least one of an ink kind condition and a condition of a kind of a printing medium used in said printing mechanisms;

an image pickup element picking up an image of said printing medium being transported with its leading edge being pinched and its rear edge being sucked, said printing medium having been printed in accordance with said first printing condition by adjusting a second printing condition including at least one of a condition of the amount of said ink and a condition of the amount of damping water by said printing mechanisms while using a printing plate on which a color chart has been recorded by said plate generating mechanisms;

a color detector detecting a print color of said color chart on said printing medium from image data obtained by the image pickup element;

a profile data generator generating profile data in accordance with characteristics of both of said plate generating mechanisms and said printing mechanisms of said printing press based upon said detected print color; and a profile data storage memory storing said profile data in association with both of said first and second printing conditions, wherein, when a printing process is newly carried out using said printing press in accordance with said first printing condition, a color correction prior to a RIP process is carried out on multi-value image data with reference to said profile data, and at least one of said condition of the amount of said ink and said condition of the amount of said damping water is adjusted in accordance with said second printing condition in association with said profile data.

4. The plate-recording and printing system according to claim 3, wherein said plate generating mechanisms are operable to form an image on said printing plate being held on a plate cylinder.

* * * * *

UNITED STATES PATENT AND TRADEMARK OFFICE

CERTIFICATE OF CORRECTION

PATENT NO. : 6,999,200 B2
APPLICATION NO. : 09/828984
DATED : February 14, 2006
INVENTOR(S) : Yasuhito Shiraishi It is certified that error appears in the above-identified patent and that said Letters Patent is hereby corrected as shown below:

On the Title page

Item (65), insert item -- (30) FOREIGN PRIORITY APPLICATION DATA
Apr 26, 2000 (JP)………..2000-125598 --

Signed and Sealed this

Twenty-sixth Day of December, 2006

JON W. DUDAS
*Director of the United States Patent and Trademark Office*